June 24, 1958   G. A. RECTOR   2,840,174
VEHICLE PARKING MEANS
Filed Feb. 25, 1955   2 Sheets-Sheet 2
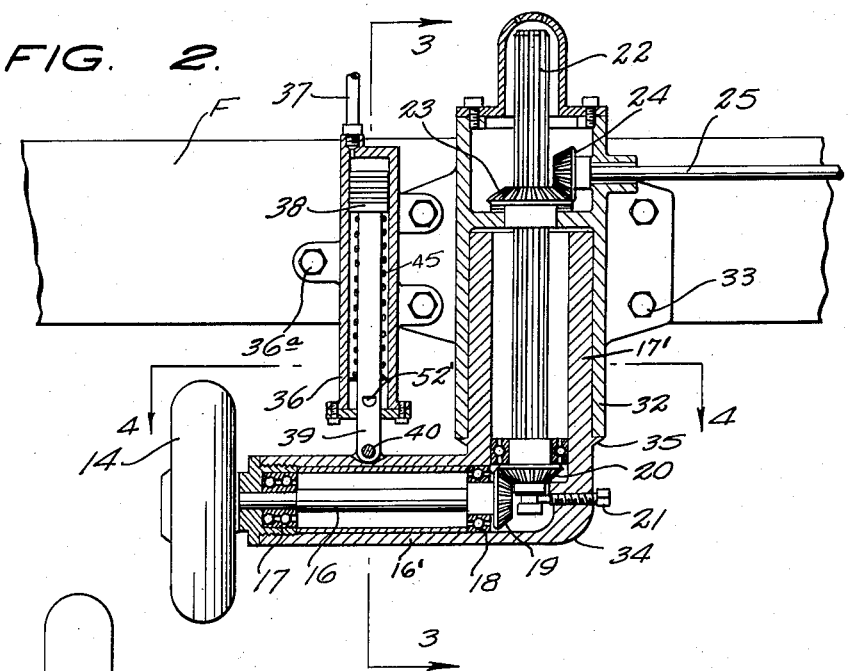
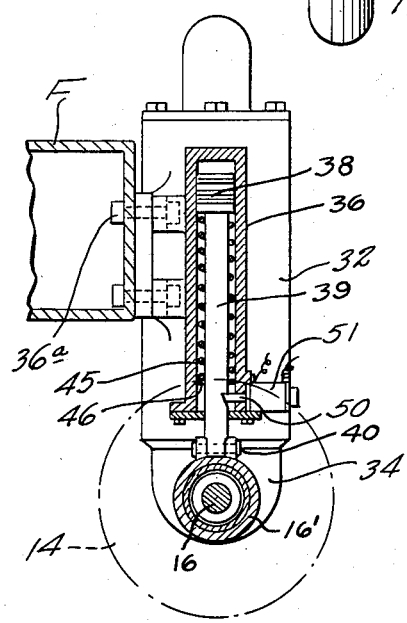
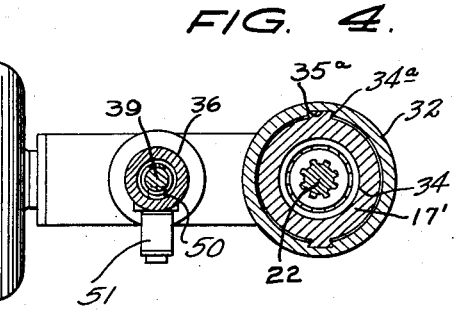
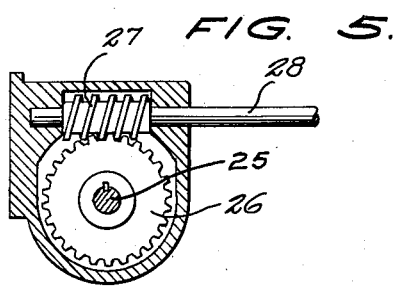
INVENTOR.
GAYLARD A. RECTOR,
BY
McMorrow, Berman + Davidson
ATTORNEYS.

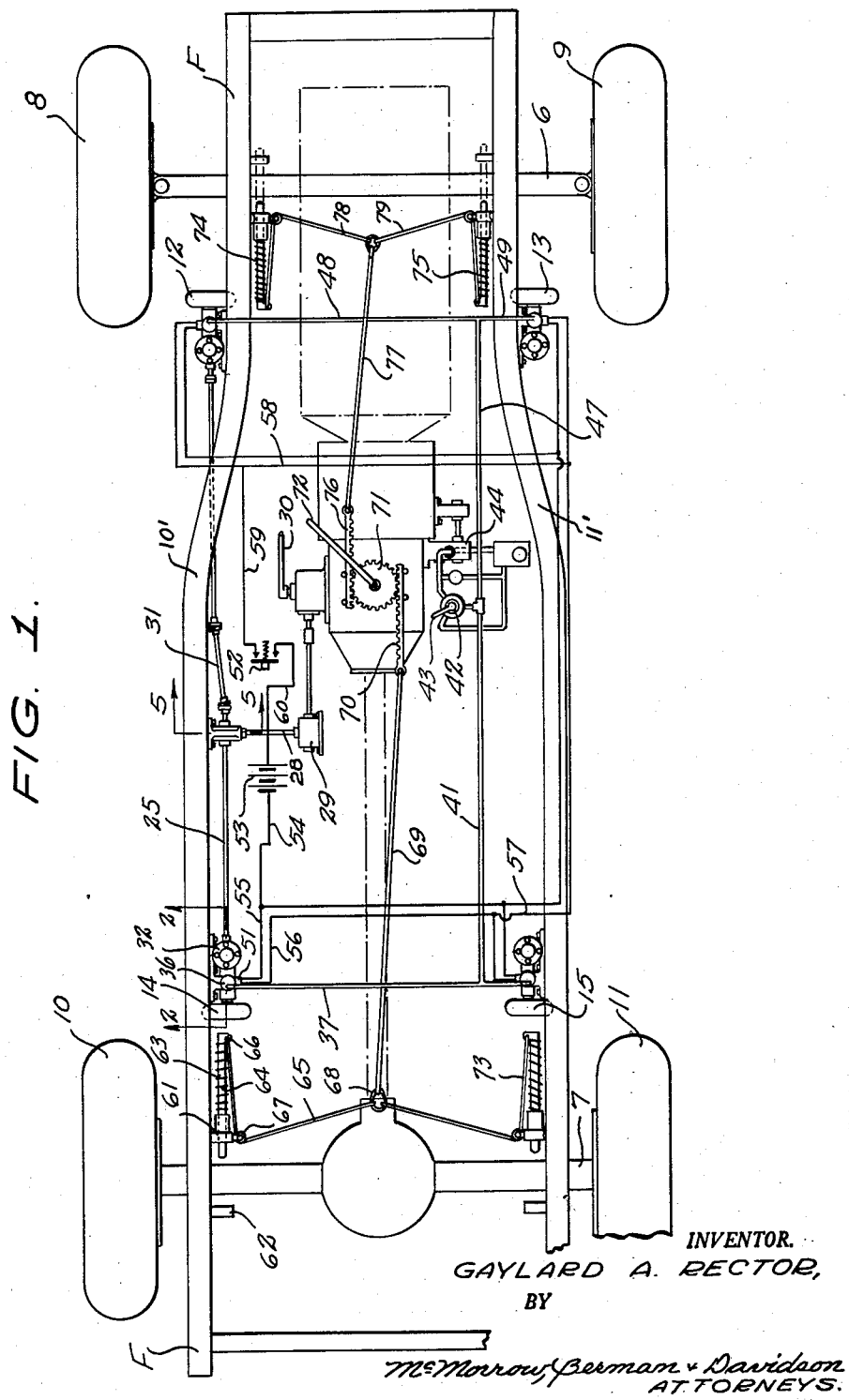

United States Patent Office 2,840,174
Patented June 24, 1958

2,840,174

VEHICLE PARKING MEANS

Gaylard A. Rector, Cleveland, Ohio

Application February 25, 1955, Serial No. 490,600

2 Claims. (Cl. 180—1)

This invention relates to improvements in parking means for vehicles.

One object of this invention is to provide generally superior and more practical parking mechanism for vehicles which enables a vehicle to be parked in a space only slightly longer than the length of the vehicle, and within which the vehicle could not be driven.

Another object of the present invention is to provide hydraulic mechanism of the character indicated above involving a wheeled jack adjacent each wheel of the vehicle, with all jacks interconnected for simultaneous operation.

Further objects of this invention are to provide safety means for preventing operation of the jacks, under normal operation of the vehicle, and means for positively locking the vehicle's axles to the vehicle frame, in order to prevent sagging of the vehicle while the vehicle is supported on the jack wheels.

Further objects, purposes, and characteristic features of this invention will appear in the following description, reference being made to the accompanying drawings, showing, merely by way of example, and in no manner, whatsoever, in a limiting sense, one specific form which the invention can assume.

Referring now to the drawings,

Figure 1 is a schematic, top plan, view of a vehicle equipped with this invention;

Figure 2 is an enlarged vertical sectional view taken on line 2—2 of Figure 1, and viewed in the direction of the arrows;

Figure 3 is a vertical sectional view, on line 3—3 of Figure 2, and viewed in the direction of the arrows;

Figure 4 is a horizontal sectional view, on line 4—4 of Figure 2, and viewed in the direction of the arrows; and Figure 5 is an enlarged horizontal sectional view taken on line 5—5 of Figure 1, and viewed in the direction of the arrows.

Referring now to the drawings, and first to Figure 1, a conventional automotive vehicle is shown, having a chassis frame F, mounted on front and rear, transverse axle 6 and 7, having thereon vehicle wheels 8, 9, and 10, 11.

The chassis frame F comprises longitudinal side members 10' and 11', on which are fixedly mounted pairs of front and rear wheeled parking jacks. The wheels of the jacks on one side of the frame F are free, while the wheels of the jacks on the other side of the frame F are power driven. Otherwise, the jacks are similar.

Detailed description of the operation and structure associated with one of the power driven parking wheels, as wheel 14, should suffice for all four of the parking jacks.

As shown in Figure 2, the parking jack wheel 14 is fixed on the outer end of a horizontal axle 16, supported in suitable bearings 17 and 18 in the horizontal arm 16' of an L-shaped tubular bracket 34. Fixed on the inner end of the shaft 16 is a bevel gear 19, in mesh with a bevel gear 20 maintained against vertical thrust by a set screw 21 (several screws may, of course, be used). Gear 20 is fixed on the lower end of a vertical splined shaft 22, in splined engagement, at all times, with a bevel gear 23, in mesh with a bevel gear 24 fixed on the inner end of a horizontal drive shaft 25. Fixed on the outer end of the drive shaft 25 is a worm gear 26, in mesh with a worm 27 on a drive shaft 28. The drive shaft 28 is driven by the engine of the vehicle, or by any desired prime mover, as device 29, controlled at will, as by handle 30.

As shown in Figure 1, the drive shaft 25 is prolonged by a flexible drive shaft, section 31, to drive the wheel 12 of the other power driven jack.

The L-shaped bracket 34 includes a vertical arm 17' which slides in a vertical tube 32 which is bolted at 33 to a side of the chassis frame side member 10'. The arm 17' extends upwardly through the lower end of the tube 32 and has thereon vertical ribs 34a engaging in grooves 35a in the tube 32. The arm 17' has an external stop flange 35 which engages the lower end of the tube 32 in the extreme elevated position of the bracket 34.

For moving the parking wheels downwardly to engage the ground so as to jack up the vehicle on the four parking wheels, and lift the vehicle wheels free of the ground, a power operated hydraulic device is provided for each parking wheel. This includes a vertical closed cylinder 36 bolted at 36a to the side members 10' and 11' of the frame F over the arms 16' of the brackets 34 and connected at its upper end with a hydraulic fluid pipe 37. Working in the cylinder 36 is a piston 38 having a piston rod 39, which passes through the lower end of the cylinder 36, and is pivoted at its lower end to the horizontal arm 16' of the L-shaped bracket 34, as by a pivot pin 40. Piston 38 is moved downwardly in its cylinder 36 by fluid under pressure passing through the pipe 37, which is connected by a main pipe 41 to a two-way control valve 42 movable, as by handle 43, to connect the cylinders 36 either to the pressure side or to the suction side of a suitable pressure system 44, driven, in any suitable manner, as from the engine of the vehicle or from a separate power source. To depress the pistons 38 to jack up the vehicle, handle 43 is moved to the right (as viewed in Figure 1), from the position shown. The pistons 38 are restored to their elevated starting positions, when fluid pressure in the cylinders 36 is relieved by return coil springs 45 circumposed on the piston rods 39 and compressed between the pistons 38 and lugs 46 inside of the cylinders 36.

As shown in Figure 1, the "jacking" cylinder 36 for the parking wheels 14 and 15 are supplied with hydraulic pressure through pipe 37, while the cylinders for operating wheels 12 and 13 are supplied through common pipe 47 and branch pipes 48 and 49 respectively.

Thus, by operating the valve handle 43 the vehicle can be jacked up on its four parking wheels.

Each jacking cylinder has safety locking means for preventing operation of piston 38 by pressure until the locking means is released. This locking means includes a dog 50 traversing the side wall of the cylinder 36 and operable by a solenoid 51, which, when energized, withdraws the dog 50 from a notch 52' provided in the piston rod 39 to permit downward movement of the piston rod 39 from its elevated starting position.

Each solenoid 51 has an energizing circuit, normally held open by spring biased master switch 52, and closed when switch 52 is operated to the right, as viewed in Figure 1. The energizing circuit for solenoid 51 includes one side of a battery 53, wires 54 and 55, solenoid 51, and wires 56, 57, 58 and 59, master switch 52, and wire 60, to the other side of the battery.

The energizing circuits for the other solenoids are similar and a detailed description thereof is unnecessary.

To prevent sagging of the wheels of the vehicle while the vehicle is jacked up, axle locking means is provided. This includes at each parking wheel, as wheel 14, apertured lugs 61 and 62, one at each side of axle 7, and fixed to the side members of the chassis frame F. A bolt 63 is supported through one of these lugs, as at 61, and can, at will, be operated to pass under axle 7 and through the other lug 62, whereby to hold the axle 7 against sagging below a predetermined level.

The bolts 63 are normally held in retracted positions by springs 64 and can be advanced to their operative positions by means of a flexible cable 65 fastened at 66 to bolt 63, passing over a pulley 67 and connected by a ring 68 to an operating cable 69 secured to a toothed rack 70 operable by a gear wheel 71 having a handle 72 thereon to exert a pull on cable 69.

At the wheel 15 is a similar axle locking bolt 73, as shown in Figure 1.

Axle locking bolts 74 and 75 adjacent the parking wheels 12 and 13 are similarly and simultaneously operable by the gear wheel 71 engaged with a rack 76, a common cable 77, and branch cables 78 and 79.

From the above description it should be obvious how the improved parking mechanism is utilized. In brief, when it is desired to park a vehicle, the vehicle is positioned abreast of the parking space.

The axle locking bolt handle 72 is then operated to lock the axles 6 and 7 relative to the frame F. Master switch 52 is then closed to withdraw the piston locking dogs 50. Pressure is then supplied to the cylinders 36 by moving the valve control handle 43 so as to depress the piston rods 39 and their wheels to the ground and elevate the vehicle on these wheels. Power can then be supplied by operating the control handle 30 to drive the two left-hand parking wheels 12 and 14, to move the vehicle sidewise into the parking space. Then the axle locking means and the hydraulic pressure in the cylinders 36 are released, so the vehicle rests on its own wheels 8, 9, 10 and 11.

The above rather specific description of one form which this invention can assume is given solely by way of example, and is not intended, in any manner whatsoever, in a limiting sense. It is to be clearly understood that all variations, modifications and adaptations of the invention are contemplated as fall within the scope of the appended claims.

What is claimed is:

1. In combination, an automotive vehicle having a chassis frame having side members and a motor mounted on said frame, and vehicle wheels upon which said frame is mounted, a vertical tube fixed to each said side member and having an open lower end, an L-shaped tubular bracket having a vertical arm slidably engaged in said tube through its open lower end, means preventing rotation of the bracket in said tube, said bracket having a horizontal arm below said tube and having inner and outer ends, a horizontal shaft journaled in said horizontal arm having inner and outer ends, a parking wheel fixed on the outer end of the horizontal shaft, a first bevel gear fixed on the inner end of the horizontal shaft, a vertical splined shaft journaled in said vertical bracket arm having a lower end and an upper end, a second bevel gear fixed on the lower end of the splined shaft and meshed with said first bevel gear, the upper end of the splined shaft being above the upper end of said vertical bracket arm and positioned within said vertical tube, a third bevel gear splined on said splined shaft above the upper end of said vertical arm, means on said tube preventing said third bevel gear from subsiding along the splined shaft to said vertical arm, a drive shaft journaled in said tube and having an inner end, a fourth bevel gear on the inner end of the drive shaft meshed with said third bevel gear, and operating means connecting said drive shaft to the vehicle motor, and hydraulic jack means operatively connected between said chassis frame and said horizontal arm of the L-shaped bracket for depressing the bracket to engage the parking wheel with the ground and elevate a vehicle wheel above the ground.

2. In combination, an automotive vehicle having a chassis frame having side members and a motor mounted on said frame, and vehicle wheels upon which said frame is mounted, a vertical tube fixed to each said side member and having an open lower end, an L-shaped tubular bracket having a vertical arm slidably engaged in said tube through its open lower end, means preventing rotation of the bracket in said tube, said bracket having a horizontal arm below said tube and having inner and outer ends, a horizontal shaft journaled in said horizontal arm having inner and outer ends, a parking wheel fixed on the outer end of the horizontal shaft, a first bevel gear fixed on the inner end of the horizontal shaft, a vertical splined shaft journaled in said vertical bracket arm having a lower end and an upper end, a second bevel gear fixed on the lower end of the splined shaft and meshed with said first bevel gear, the upper end of the splined shaft being above the upper end of said vertical bracket arm and positioned within said vertical tube, a third bevel gear splined on said splined shaft above the upper end of said vertical arm, means on said tube preventing said third bevel gear from subsiding along the splined shaft to said vertical arm, a drive shaft journaled in said tube and having an inner end, a fourth bevel gear on the inner end of the drive shaft meshed with said third bevel gear, and operating means connecting said drive shaft to the vehicle motor, and hydraulic jack means operatively connected between said chassis frame and said horizontal arm of the L-shaped bracket for depressing the bracket to engage the parking wheel with the ground and elevate a vehicle wheel above the ground, said hydraulic jack means comprising a vertical cylinder fixed to the chassis, said cylinder having a side wall and a lower end, a piston in said cylinder, a piston rod on and depending from the piston and through the lower end of the cylinder, said rod having a lower end connected to the horizontal arm of the L-shaped bracket, a locking dog slidably traversing the side wall of the cylinder, said piston rod having a notch above the lower end of the cylinder with which said dog is lockably engageable to hold the piston rod in an elevated starting position, and operating means for withdrawing said dog from the piston rod notch.

References Cited in the file of this patent
UNITED STATES PATENTS

| Number | Name | Date |
|---|---|---|
| 1,532,479 | Fedowicz | Apr. 7, 1925 |
| 1,639,054 | Palmer | Aug. 16, 1927 |
| 1,780,972 | Di Neuberg | Nov. 11, 1930 |
| 1,928,305 | Blakesley | Sept. 26, 1933 |
| 1,974,705 | De Vaal | Sept. 25, 1934 |
| 2,024,844 | Berman | Dec. 17, 1935 |
| 2,692,143 | Rando | Oct. 19, 1951 |
| 2,706,009 | Schramm | Apr. 12, 1955 |
| 2,717,786 | Prill | Sept. 13, 1955 |